United States Patent
Nadimpalli et al.

(10) Patent No.: US 10,733,018 B2
(45) Date of Patent: Aug. 4, 2020

(54) SYSTEMS AND METHODS FOR PROVIDING SERVICES IN A STATELESS APPLICATION FRAMEWORK

(71) Applicant: PAYPAL, INC., San Jose, CA (US)

(72) Inventors: Venkata Ramana Varma Nadimpalli, Fremont, CA (US); Alexander Y. Shvid, San Jose, CA (US); Vahini Pobbathi, San Jose, CA (US); Karl Anton Hennig, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 172 days.

(21) Appl. No.: 15/965,283

(22) Filed: Apr. 27, 2018

(65) Prior Publication Data

US 2019/0332433 A1 Oct. 31, 2019

(51) Int. Cl.
*G06F 9/50* (2006.01)
*G06F 16/903* (2019.01)

(52) U.S. Cl.
CPC .............. *G06F 9/50* (2013.01); *G06F 16/903* (2019.01)

(58) Field of Classification Search
CPC . G06F 9/4856; H04L 67/14; H04L 29/08594; H04L 67/1029
See application file for complete search history.

(56) References Cited

U.S. PATENT DOCUMENTS

| | | | |
|---|---|---|---|
| 7,716,279 B2 * | 5/2010 | Savchenko | H04L 69/18 709/203 |
| 9,152,533 B1 * | 10/2015 | Fateev | G06F 11/36 |
| 2004/0261022 A1 * | 12/2004 | Deutesfeld | G06F 9/505 715/229 |
| 2006/0259604 A1 * | 11/2006 | Kotchavi | H04L 41/0226 709/223 |
| 2009/0049155 A1 * | 2/2009 | Robinson | H04L 67/02 709/217 |
| 2010/0100891 A1 | 4/2010 | Boeckenhauer et al. | |
| 2011/0307703 A1 | 12/2011 | Ogg et al. | |
| 2012/0166481 A1 | 6/2012 | Dittrich | |
| 2014/0108483 A1 * | 4/2014 | Tarta | G06F 9/5072 709/201 |
| 2014/0143285 A1 | 5/2014 | Duff et al. | |
| 2019/0065349 A1 * | 2/2019 | Sharma | G06F 11/3688 |

* cited by examiner

*Primary Examiner* — Dong U Kim
(74) *Attorney, Agent, or Firm* — Haynes and Boone LLP

(57) ABSTRACT

Methods and systems for providing an external scheduler in a stateless application framework are presented. A first instance of a stateless application transmits a job request to a data processing engine, and submits a message to a messaging queue. The message indicates a task to be performed according to a delayed schedule. The first instance of the stateless application terminates after submitting the message. The messaging queue transmits the message to the stateless application framework according to the delayed schedule. Upon receiving the message, a second instance of the stateless application is instantiated. The second instance of the stateless application performs an action based on the message and terminates.

20 Claims, 8 Drawing Sheets

US 10,733,018 B2

SYSTEMS AND METHODS FOR PROVIDING SERVICES IN A STATELESS APPLICATION FRAMEWORK

BACKGROUND

The present specification generally relates to stateless applications, and more specifically, to providing a mechanism to deliver services using distributed stateless applications according to various embodiments.

RELATED ART

Data processing systems may use state machines to keep track of states and contexts across different sessions. However, when the number of data processing requests increases, the amount of computer resources (e.g., memory and processing resources) required to run the different instances of state machines and to store the different session states or contexts also increases. Furthermore, the time required to complete a workflow within a session may vary. For example, in some instances, data processing components external to the data processing systems may be used in the workflow, and it may take an extended period of time (e.g., several minutes, several hours) for the external data processing components to provide results back to the data processing systems. Keeping the state and context data in the memory of the data processing systems while the session is in an idle state can be inefficient.

Stateless applications may be developed to improve the efficiency of the data processing systems by eliminating the need of storing the state and context data in the memory of the data processing systems. However, stateless applications present different challenges when implemented in a distributed environment. Thus, there is a need for providing a stateless application framework for developing data processing systems that overcomes problems associated with conventional systems and methods.

Figure 1:
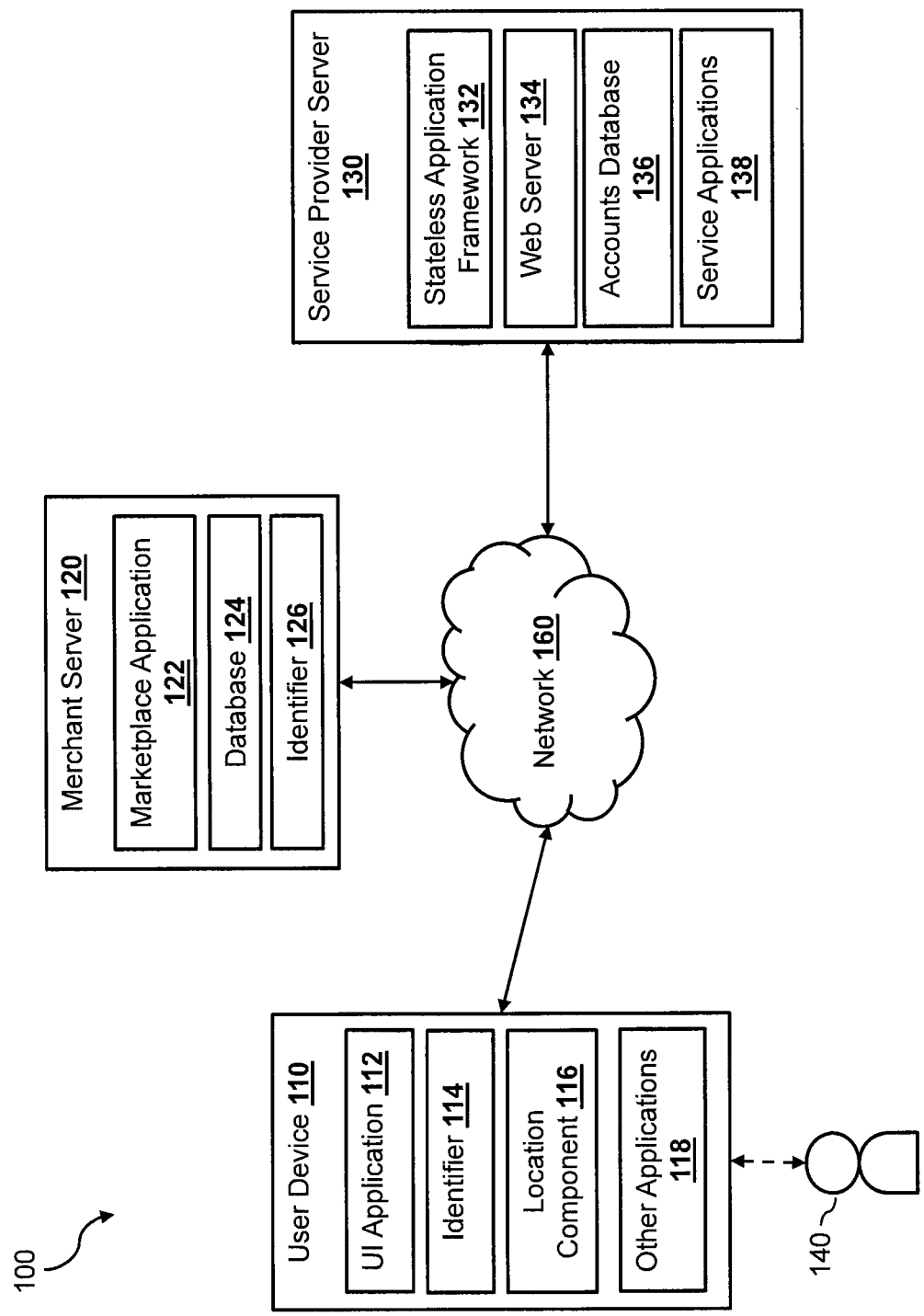
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a stateless application framework in a data processing system. The stateless application framework includes a stateless application module, a context database, and a messaging queue in various embodiments. The stateless application framework may be utilized by different applications for implementing different workflows. Each workflow may be associated with one or more state machine configurations representing different states within the workflow. Upon receiving an indication of an event from an application, the stateless application module may initiate a corresponding workflow for the application. In some embodiments, a first instance of the stateless application module is instantiated. The first instance of the stateless application may be allocated computer resources, such as non-persistent memory (e.g., random access memory) and computer processing cycles to handle the indication of the event according to the workflow.

In some embodiments, the stateless application module may select a state machine configuration corresponding to the workflow, and assign an initial state in the configuration to the event. The stateless application module may also create, for the event, a record that includes state data (e.g., context data) that identifies a current state of the event, and may store the record in a persistent data storage (e.g., a hard drive, a flash drive, etc.), such as the context database. In some embodiments, the persistent data storage is external to the stateless application module and the application that initiated the event. By storing the state data in the persistent data storage, the state data of the event may be made available even after the first instance of the stateless application module is terminated. For example, another instance of the stateless application module may subsequently be instantiated and access the record to perform actions based on the state data in the record.

Based on the workflow associated with the event, the stateless application module may also transmit job requests to one or more data processing engines external to the stateless application module. In some embodiments, the stateless application module may retrieve the state data of the record from the context database, and include the state data in the job requests. After transmitting the job requests to the one or more data processing engines, the first instance of the stateless application module may be terminated, such that the computer resources allocated to the first instance of the stateless application module may be freed up for other processes or threads (e.g., other concurrently running instances of the stateless application module, etc.). This is especially advantageous when the time taken by the data processing engines to complete the job requests is long, as the first instance of the stateless application module does not take up the computer resources while idling and waiting for a response (such as a message) from the data processing engines.

Since the state data of the event is stored in the persistent storage, the state data is not lost, and can be made available to other instances of the stateless application module. For example, other instances of the stateless application module may access the record and update the state data of the record.

When a data processing engine completes the corresponding job request, the data processing engine may send a response to the stateless application module. The response may include the state data and other identification data that identifies the event and/or the state machine configuration associated with the event. Upon receiving the response, a second instance of the stateless application module may be instantiated to perform one or more actions based on the response. For example, the second instance of the stateless application module may update the state data of the record based on the response and the workflow (e.g., when the workflow indicates that the completion of the job request moves the event from one state to another state). In addition, the stateless application module may also transmit another job request to the same or another data processing engine based on the response, where the job request includes the updated state data from the record. Furthermore, the stateless application module may also transmit the updated state data to the application that initiates the event.

The processing performed by each of the data processing engines may be dependent on a current state of the user account within the workflow. As such, the data processing engine may perform the processing based on the state data provided in the job request. The stateless application module may also transmit different job requests to different data processing engines in parallel (e.g., when the job requests are not dependent on each other). For example, the first instance of the stateless application module may transmit job requests to the multiple data processing engines when a first state in the state machine configuration is assigned to the event. Further, while a first data processing engine is still performing the requested processing, a second data processing engine may complete the processing and may transmit a response to the stateless application module, which causes the second instance of the stateless application module to update the status data of the record (e.g., changing the state of the event from the first state to a second state). As a result, when the first data processing engine returns with a response to the stateless application module, the stateless application module may attempt to perform an inaccurate update to the status data in the record. Furthermore, the tasks that the first processing engine performed for the event may be incorrect since the tasks were performed based on the event in the first state, and not in the second state.

Thus, according to various embodiments of the disclosure, a locking pattern mechanism is employed to ensure that the state data stored in the context database is consistent and that the tasks performed by the various data processing engines are performed according to the current state of the event. In some embodiments, in addition to the state data and other identification data, the record generated by the stateless application module for the event also includes a version number. The version number may be initiated with an initial version number when the record is created. When an instance of the stateless application module updates the state data of the record, the instance of the stateless application module may also update the version number (e.g., by incrementally increasing the version number, etc.).

In some embodiments, when the first instance of the stateless application module transmits the job request to a data processing engine, the first instance of the stateless application module may include in the job request the version number as well as the state data of the record. The response from the data processing engine may also include the state data and the version number. Upon receiving the response and before updating the state data in the record, the second instance of the stateless application module may check the version number stored in the record against the version number indicated in the response. If the version numbers match, the stateless application module may proceed with updating the state data in the record based on the response. On the other hand, if the version number in the record and the version number indicated in the response do not match, the stateless application module may retrieve the updated state data from the record and transmit another job request to the data processing engine with the updated state data, such that the data processing engine may perform the data processing based on the updated state data.

In some embodiments, the context database may also verify the version number before allowing the stateless application module to update the state data. For example, when the second instance of the stateless application module requests to update the state data of a record, the second instance of the stateless application module may also provide a version number. The context database may compare the version number received from the stateless application module against the version number currently stored in the record. If the context database determines that the version number received from the stateless application module and the version number currently stored in the record match, the context database may allow the second instance of the stateless application module to update the state data. However, if the context database determines that the version number received from the stateless application module and the version number currently stored in the record do not match, the context database may prohibit the second instance of the stateless application module from updating the state data. Such operations can ensure consistency of data and prevent one instance of a stateless application from performing an update that would conflict with another update from a different instance.

FIG. 1 illustrates an electronic transaction system 100 according to one embodiment of the disclosure in which a stateless application framework may be implemented. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services or conduct financial transactions (e.g., account transfers or payments) with the service provider server 130. The user 140 may also use the user device 110 to initiate an event (e.g., requesting for working capital) with the service provider server 130. Similarly, a merchant associated with the merchant server 120 may use the merchant server 120 to log in to a merchant account to conduct account services or conduct financial transactions (e.g., payment transactions) with the service provider server 130. The merchant may use the merchant server 120 to initiate an event (e.g., a seller onboarding request) with the service provider server 130. The user device 110 and the merchant server 120, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct transactions (e.g., shopping, purchasing, bidding, etc.) or initiate events (e.g., working capital requests, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 119 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 119 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 116 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as seller onboarding, payment intermediary between customers of the merchant and the merchant itself. For example, once the merchant has successfully completed the seller onboarding process with the service provider server to become an authorized seller, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of the user device 110 and one or more merchants. As such, the service provider server 130 may include one or more service applications 138, which may be adapted to interact with the user device 110 and/or the merchant server 120 over the network 160 to facilitate the seller onboarding, working capital requests, data transfers, content access, searching, selection, purchase, payment of items, and/or other services offered by the service provider server 130. In one example, the service provider server 130 may be provided by PayPal®, Inc. of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130, such as a webpage that enables a user to initiate a working capital request and a webpage that enables a user to initiate a seller onboarding process. As a result, a user may access a user account associated with the user and access various services offered by the service provider server 130, by generating HTTP requests directed at the service provider server 130.

The service provider server 130 may also include a stateless application framework 132 that provides the components to implement one or more stateless applications. For example, one or more of the service applications 138 may be implemented within the stateless application framework 132 to improve the efficiency and performance of the service applications 138, such as improving the speed of processing data by the service applications 138 and reducing computational resources required by the service applications 138. Note that the stateless application framework 132 is not limited to web server contexts but may be used in a number of various computing contexts.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the web server 134 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
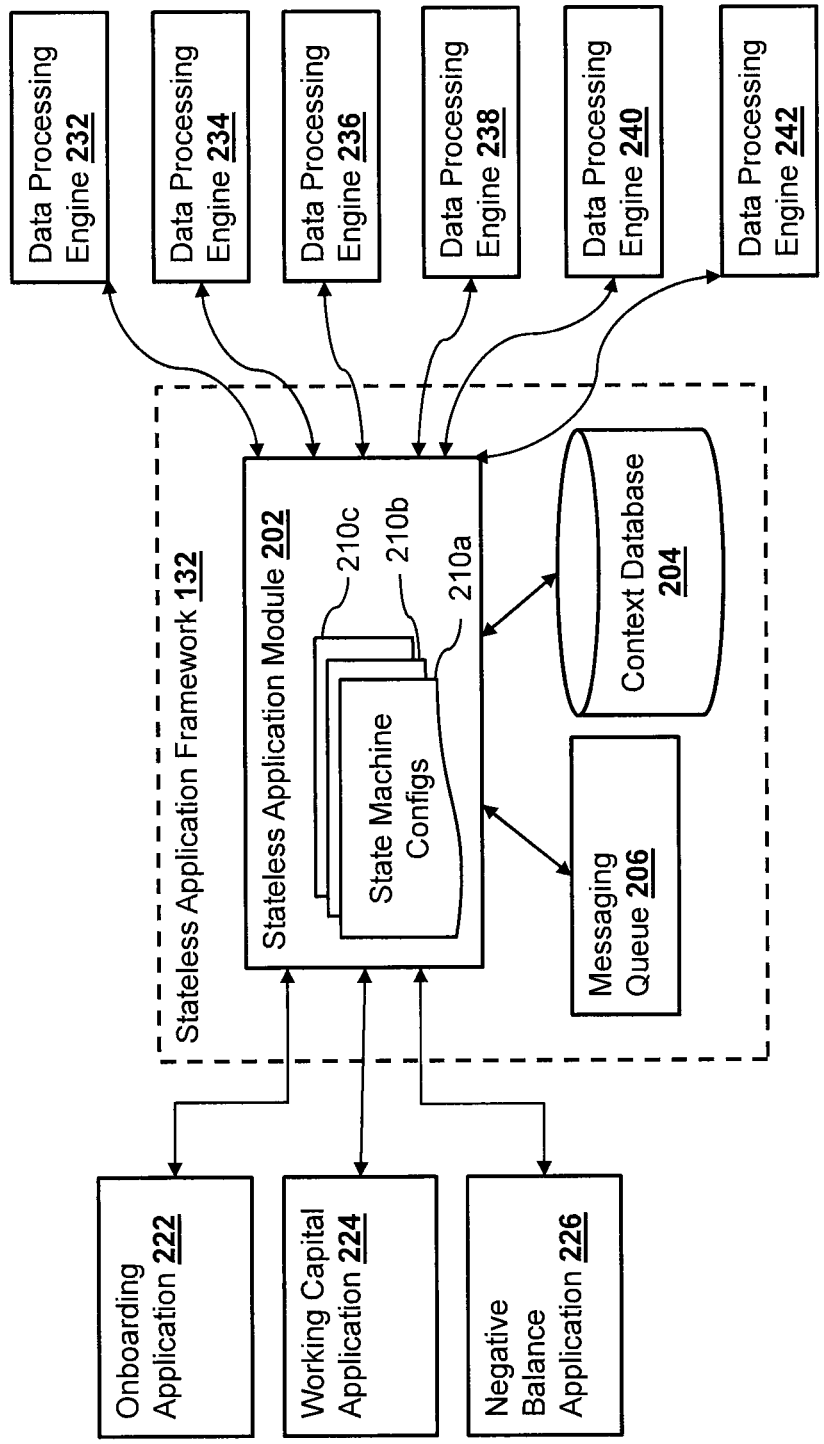
FIG. 2 is a block diagram illustrating a stateless application framework according to an embodiment of the present disclosure.

FIG. 2 illustrates a block diagram of the stateless application framework 132 according to an embodiment of the disclosure. The stateless application framework 132 includes a stateless application module 202, a context database 204, and a messaging queue (a messaging module) 206 in this embodiment. As shown, the stateless application module 202 is communicatively coupled to one or more applications (e.g., one or more service applications 138). In this example, the stateless application module 202 is communicatively coupled to an onboarding application 222, a working capital application 224, and a negative balance application 226. Each of the applications 222-226 may be configured to perform a process according to a workflow using one or more of the data processing engines 232-242 via the stateless application framework 132. For example, the onboarding application 222 may be configured to, in response to receiving an onboarding request from a merchant via the merchant server 120 or from the user 140 via the user device 110, perform an onboarding process according to a corresponding onboarding workflow to authorize the merchant or the user to become an authorized user for using electronic services that the service provider server 130 offers to authorized users. In some embodiments, the process (e.g., the user onboarding process) and the corresponding workflow may define a state machine configuration that includes multiple states and available paths to traverse the states. Each of the applications 222, 224, and 226 may be internally stateless—that is, they may be configured to take a particular action in response to particular input, but do not store internal state that would affect the action taken; rather, only the input (which may include state information) dictates the action(s) taken, according to various embodiments.

Figure 3:
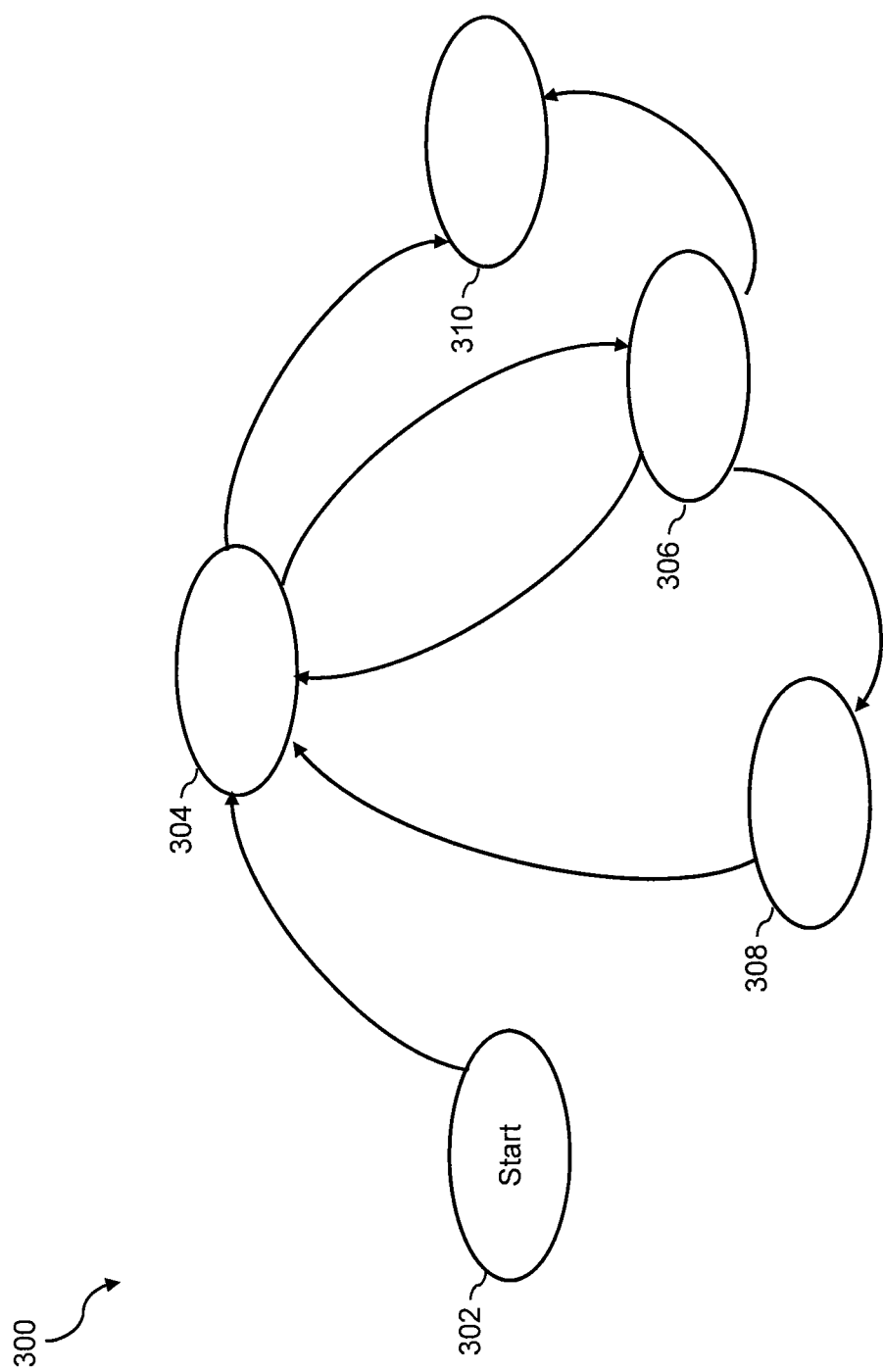
FIG. 3 is a state diagram illustrating an example state machine configuration according to an embodiment of the present disclosure.

FIG. 3 illustrates an example state machine configuration 300 according to an embodiment of the disclosure. As shown, the state machine configuration 300 includes five different states 302-310 and various paths to traverse among the different states 302-310. Each of the states 302-310 may indicate a progress within the corresponding workflow, and may also indicate to the corresponding application a status of an associated user account. For example, the state machine configuration 300 may correspond to the onboarding application configured to perform an onboarding process to approve a user account to become an authorized user for the service provider server 130. In this example, each of the different states 302-310 may indicate a different approval status within the onboarding workflow. For example, the state 302 may be a start state of the onboarding workflow and may indicate that the onboarding process has just begun. As such, the user account may be assigned to the state 302 when the onboarding process begins.

The state 304 may be an intermediate state and may indicate that the user account is partially approved. For example, the state 304 may indicate that at least one of the sub-processes of the onboarding process is completed. As shown, from the state 302, the user account may reach the state 304, for example, based on a completion of a sub-process or an indication of an event. In one example, one or more of the data processing engines 232-242 may be used to process data associated with the user account. Based on a completion of the sub-process by one or more of the data processing engine 232-242, the user account may be moved from the state 302 to the state 304.

From the state 304, the user account may reach either the state 306 or the state 310. The state 306 may be another intermediate state and may indicate a pending state of a particular sub-process of the onboarding process, while the state 310 may be a complete approval state indicating that the user account is fully approved to be an authorized user. For example, when the user account is at the state 304, based on one or more criteria using data associated with the user account, the onboarding workflow may require that a background check to be performed on the user account. In one example, one of more data processing engines 232-242 may be used to analyze the data associated with the user account to determine whether a background check is required. In the event that the background check is not required, the user account may reach the state 310 from the state 304, indicating that the user account is fully approved to be an authorized user for the service provider server 130. On the other hand, if it is determined that a background check is required to be performed on the user account, the user account may reach the state 306 while awaiting a result of the background check, which may take an extended period of time (e.g., hours or days) to complete.

From the state 306, the user account may reach the state 308 or the state 310, depending on the result from the background check. For example, if it is determined that the background check is clear, the user account may be moved to the complete approval state 310. On the other hand, if it is determined that the background check has failed, the user account may be moved to the state 308, which may be a denied state indicating that the onboarding request of user account is denied.

As shown in this example, even when the user account is in the denied state 308, the state machine configuration 300 may allow the user account to traverse back to the state 304 based on an event. For example, the onboarding process may allow the user account to reapply to be an authorized user when a predetermined time period (a month, a year, etc.) has passed or a specific event has occurred (e.g., payment of a debt, increase of a credit score above a threshold, increase of income above a threshold, etc.) after the user account has been denied. The user account is then moved to the state 304. As such, the state machine configuration 300 may provide traversal among the different states 302-310 based on a completion of one or more predetermined sub-processes or an indication of an event. While the state machine configuration 300 was discussed using the example of an onboarding application, it has been contemplated that the state machine configuration 300 (or another state machine configuration) may be used for other applications, such as the working capital application 224 or the negative balance application 226. As such, multiple state machine configurations (e.g., state machine configurations 210a, 201b, and 210c) corresponding to different applications may be stored by the stateless application module 202, for example, in the context database 204.

Figure 4:
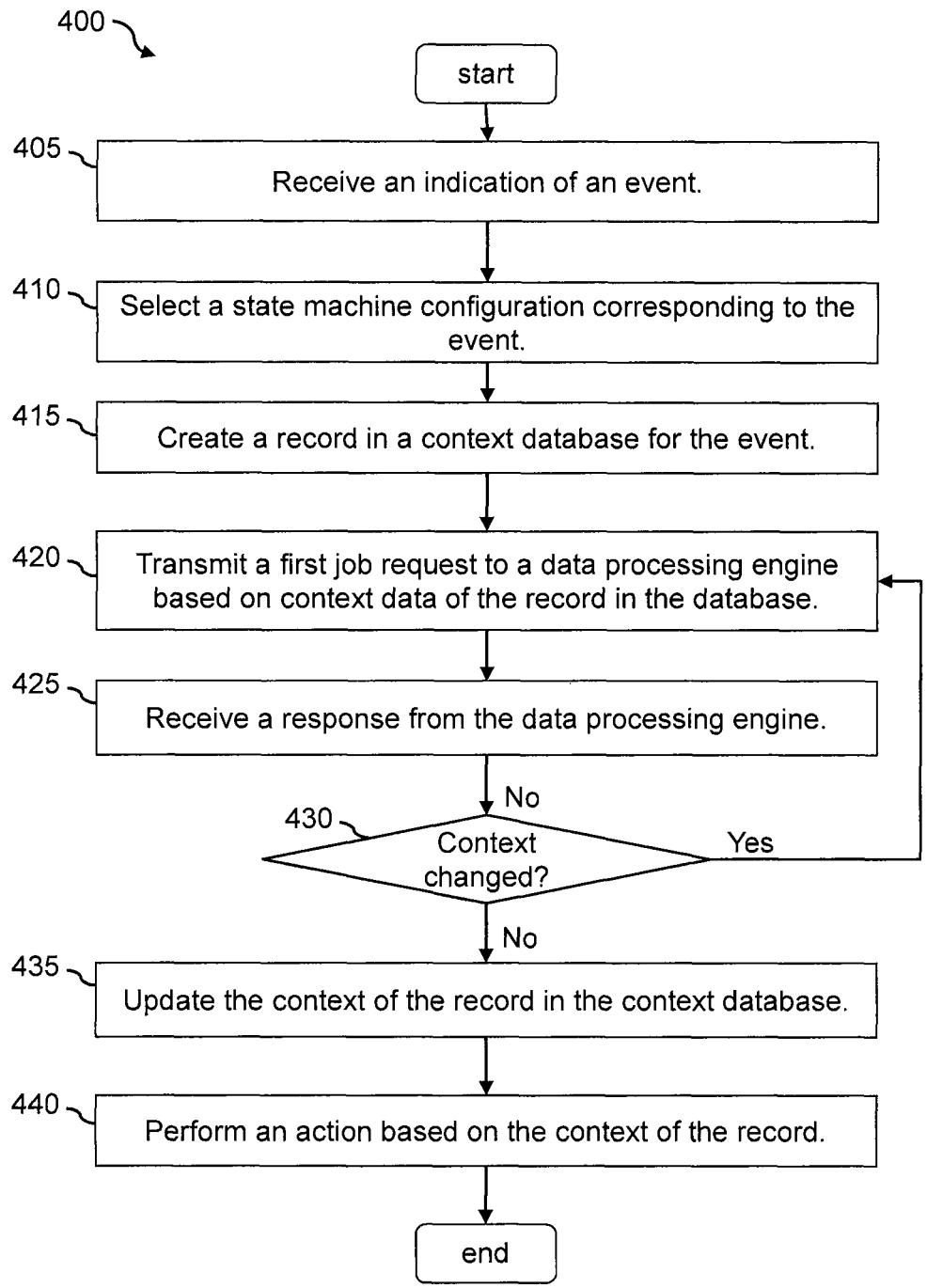
FIG. 4 is a flowchart showing a process of providing a stateless application framework according to an embodiment of the present disclosure.

FIG. 4 illustrates a process 400 for providing a stateless application framework to facilitate the processes/workflows associated with various applications according to various embodiments of the disclosure. In some embodiments, the process 400 may be performed by the stateless application framework 132 (and the stateless application module 202) of the service provider server 130. As discussed above, the stateless application framework 132 may be configured to facilitate processing of data for various applications. The stateless application framework 132 may be provided as a service to the various applications to facilitate processing of data using the stateless application module 202. For example, the stateless application framework 132 may be implemented to include a software library and a set of application programming interfaces (APIs) to interface with the applications.

In some embodiments, an application may configure the stateless application framework 132 to facilitate data processing for the application by providing one or more state machine configurations and one or more workflows (e.g., via the set of APIs). For example, a state machine configuration 210a may be obtained by the stateless application module 202 to be associated with the onboarding application 222, a state machine configuration 210b may be obtained by the stateless application module 202 to be associated with the working capital application 224, and a state machine configuration 210c may be obtained by the stateless application module 202 to be associated with the negative balance application 226.

In addition, each of the workflows provided by an application may include performing one or more actions using one or more of the data processing engines 232-242. Each workflow may be implemented as a data file, such as an XML file, and may indicate performance of one or more actions. At least some of the actions indicated in the workflow may be dependent on a status of the user account. For example, the workflow may indicate a performance of a first task if the user account is at state 302 and a performance of a second task if the user account is at state 304.

The process 400 may begin by receiving (at step 405) an indication of an event. For example, an indication of an event may be received from one of the applications 222-226 (e.g., via an API call). In one example, the indication may be an onboarding event for a user account received from the onboarding application 222. Upon receiving the indication, an instance of the stateless application module 202 may be instantiated (e.g., by a computer system on which the stateless application module 202 runs) to perform functionalities based on the indication. In some embodiments, the instance of the stateless application module 202 may be a new process or a new thread, to which certain computer resources (e.g., non-persistent memory space, processing cycles, etc.) may be allocated by the computer system that implements the stateless application module 202. For clarity and simplicity, the instance of the stateless application module 202 may be referred simply as the stateless application module 202.

Multiple instances of the stateless application module 202 may be instantiated and concurrently running within the stateless application framework 132. For example, if another indication is received (e.g., from the working capital application 224), another instance of the stateless application module 202 may be instantiated for performing functionalities for the working capital application 224.

Based on the indication and the application from which the indication is received, the process 400 may select (at step 410) a state machine configuration and a workflow corresponding to the event. For example, the stateless application module 202 may determine that the indication is received from the onboarding application 222, and may select and retrieve the state machine configuration 201a and the workflow corresponding to the onboarding application 222 from the context database 204. In some embodiments, the state machine configuration 201a may correspond to the state machine configuration 300 of FIG. 3. In some embodiments, instead of using the workflow stored in the database 204, the stateless application module 202 may enable the applications to specify a customized workflow for the event. For example, the onboarding application may include in the indication a customized workflow specific to the user account. While the customized workflow still corresponds to the state machine configuration 210a, the customized workflow may specify different processing configurations than the workflow stored in the database 204. For example, the customized workflow may require that certain sub-processes of the onboarding process to be performed in serial, instead of in parallel as required by the workflow stored in the database 204, and vice versa.

The stateless application module 202 may assign a state in the state machine configuration to the event based on the workflow, and store the state data associated with the event in a persistent data storage (e.g., a hard drive, a flash drive, etc.). As such, the process 400 then creates (at step 415) a record and stores the record in a persistent storage for the event. For example, since the stateless application module 202 has just received the indication of the event without performing any processing according to the workflow, the user account (and/or the event) is assigned to the start state (e.g., the state 302 of the state machine configuration 300). As such, the stateless application module 202 may generate a record for the event and/or the user account, and may insert state data indicating the start state 302 in the record. The stateless application module 202 may also store the record in the context database 204.

In some embodiments, the context database 204 may include data structures and modules for managing data in the data structures (e.g., a relationship database management system, etc.). The data and the data structures may be stored in non-persistent data storage (e.g., a hard drive, a flash drive, etc.). Furthermore, the context database 204 may be external to the stateless application module 202 such that the records stored in the context database 204 may still be made available when instances of the stateless application module are terminated and/or the stateless application framework is shut down (or crashes).

In order to ensure consistency of services delivered by the data processing engines 232-242, the stateless application module 202 may also include a version number indicating a version of the state data in the record. When the record is created, an initial version number (e.g., 1.0) may be assigned to, and stored in, the record.

After creating the record, the stateless application module 202 may begin performing functionalities for the event. For example, the stateless application module 202 may begin performing tasks according to the workflow associated with the event (either retrieved from the database or provided in the indication). In some embodiments, the tasks may be delegated by the stateless application module 202 to one or more of the data processing engine 232-242 according to the workflow. As such, the workflow may indicate which of the data processing engines 232-242 to use to perform the tasks. In some of these embodiments, the workflow may also indicate an order of calling the different data process engines 232-242 to performing the tasks. For example, the workflow may indicate calling the data processing engines 232 and 234 in parallel (as the tasks performed by the data processing engine 232 and 234 do not depend on each other), but calling the data processing engine 238 only after the tasks performed by the data processing engine 234 is completed. Furthermore, the workflow may indicate which of the data processing engines 232-242 to use based on the state of the user account. For example, the workflow may indicate calling the data processing engines 232, 234, and 238 when the user account is in state 302, and calling the data processing engines 236 and 240 when the user account is in state 306.

As such, the process 400 may begin calling (e.g., transmitting job requests to) the different data processing engines 232-242 according to the workflow. Specifically, the process 400 may transmit (at step 420) a first job request to a data processing engine based on the state data of the record. For example, the stateless application module 202 may transmit a first job request to the data processing engine 232 based on the workflow. The stateless application module 202 may indicate a task description in the first job request. In some embodiments, the task description may be embedded in the name of a function call associated with the first job request.

In some embodiments, the stateless application module 202 may also include the state data associated with the user account and/or the event (e.g., the state data of the record created for the user account and/or the event) and the version number associated with the state data (e.g., the version number stored in the record) in the first job request, as the data processing engine 232 may perform the data processing tasks for the event based on the state data (e.g., different data processing tasks may be performed based on the different states that the user account is in, etc.).

As discussed above, the time it takes for a data processing engine to perform the corresponding tasks may vary, and some tasks may take as long as several minutes, several hours, or even several days to complete. In some embodiments, according to the workflow associated with the event, the stateless application module 202 may transmit another job request to the data processing engine 234 before receiving a response from the data processing engine 232, such that the data processing engines 232 and 234 may perform tasks in parallel. When the instance of the stateless application module 202 finishes transmitting the requests according to the workflow, the instance of the stateless application module 202 may end (e.g., terminate), such that the computer resources (e.g., the memory space, the processing cycles, etc.) allocated to the instance of the stateless application module 202 may be freed up for other processes or threads (e.g., other concurrently running instances of the stateless application module 202, etc.).

When the data processing engine 232 completes the tasks associated with the first job request, the data processing engine 232 may transmit a response to the stateless application framework 132. As such, the process 400 at step 425 receives a response from the data processing engine. Upon receiving the response, another instance of the stateless application module 202 may be instantiated for handling the response. The response may include an indication of whether the requested tasks have been completed, the state data, and the version number that was included in the first job request.

The stateless application module 202 may then retrieve the record from the context database 204. As discussed above, the time taken by the data processing engine 232 may vary, and as such, by the time that the response is received from the data processing engine 232, one or more other instances of the stateless application module 202 may have changed (updated) the state data of the record based on one or more responses received by other data processing engines (or other events). For example, before receiving the response from the data processing module 232, the stateless application module 202 may have received a response from the data processing engine 234 indicating a completion of the corresponding tasks. Based on the response from the data processing engine 234 and the workflow, an instance of the stateless application module 202 may be instantiated and may update the state data of the record. In some embodiments, as that instance of the stateless application module 202 updates the state data of the record, that instance of the stateless application module 202 may also change the version number (e.g., incrementally increasing the version number) to reflect that the state data has been changed from the previous version. In one example, the stateless application module 202 may change the version number from 1.0 to 1.1.

Since the data processing engine 232 performs the data processing based on the state data included in the first job request, and that the state of the user account has been changed before completion of the corresponding tasks, the tasks performed by the data processing engine 232 may not be consistent with the current state of the user account.

Thus, upon receiving the response from the data processing engine, the process 400 may determine (at step 430) whether the state data (the context) of the user account has been changed. If it is determined that the state data has been changed since the job request was transmitted, the process 400 reverts back to the step 420 to transmit another job request to the data processing engine based on the updated state data from the record. For example, the stateless application module 202 may compare the version number included in the response against the version number of the retrieved record. In this example, the version number included in the response (e.g., version 1.0) does not match the version number of the retrieved record (e.g., version 1.1) since the state data has been updated based on another response from the data processing engine 234. As such, the stateless application module 202 may not update the state data of the record, but may transmit a second job request to the data processing engine 232. The second job request may have the same task description as the first job request (e.g., the same function call), but using the updated state data and the updated version number from the record as the parameters for the second job request. The instance of the stateless application module 202 may then end (e.g., terminate) after sending the second job request.

In some embodiments, the context database 204 may be configured to guard the record from being incorrectly updated. For example, the context database 204 may prevent the stateless application module 202 from updating/changing the state data of the record when the version number provided by the stateless application module 202 does not match the version number listed in the record.

Referring back to FIG. 4, if it is determined (at step 430) that the state data has not been changed since the job request was transmitted, the process 400 updates (at step 435) the state data of the record in the context database based on the response. For example, after sending the second job request to the data processing engine 232, the data processing engine 232 may perform the tasks based on the updated state data, and return with a response when the tasks are completed. Upon receiving the response, another instance of the stateless application module 202 may be instantiated to handle the response. This time, the response may include the updated version number (e.g., version 1.1). The stateless application module 202 may again retrieve the record from the context database 204. Assuming that the state data has not been updated since the transmission of the second job request, the stateless application module 202 may determine that the version number included in the response (e.g., version 1.1) matches the version number of the record (e.g., version 1.1). The stateless application module 202 may then update the state data (and also the version number, e.g., to version 1.2) of the record and may save the updated record in the context database 204. For example, when the current state data indicates the state 304, the stateless application module 202 may update the state data to indicate the state 310 (e.g., the completely approved state) based on the response and the workflow.

After updating the record, the process 400 may perform (at step 440) an action based on the updated state data of the record and the workflow. For example, in some embodiments, based on the workflow and the updated state data of the record, the stateless application module 202 may transmit the updated state data (indicating the state 310) to the onboarding application 222 (e.g., the application that initiates the event). In some embodiments, instead of or in addition to transmitting the updated state data to the onboarding application 222, the stateless application module 202 may transmit another job request to a data processing engine (e.g., the data processing engine 238) according to the workflow.

The locking pattern techniques described above ensure that the services delivered by the various data processing engines 232-242 are consistent with the current state of the corresponding user account and/or event. As discussed above, the stateless application framework 132 may be utilized by multiple applications (e.g., the onboarding application 222, the working capital application 224, and the negative balance application 226, etc.), and may, for each of the applications, facilitate data processing functionalities for multiple events (e.g., for multiple user accounts, etc.). Thus, the record created by the stateless application module 202 needs to identify the correct user account, event, and state machine configuration, such that a different instance of the stateless application module 202 (which may be instantiated subsequently) may retrieve the correct record for the event. For example, since the instances of the stateless application module 202 that transmit the job requests may be different from the instances of the stateless application modules 202 that receive the corresponding responses, the job requests and the responses also need to identify the correct user account, event, and state machine configuration such that the instances of the stateless application modules 202 that receive the responses may update the corresponding records based on the corresponding state machine configurations. As such, according to another aspect of the disclosure, an identifier that may identify a user account, an event, and a state machine configuration may be generated for the event.

Figure 5:
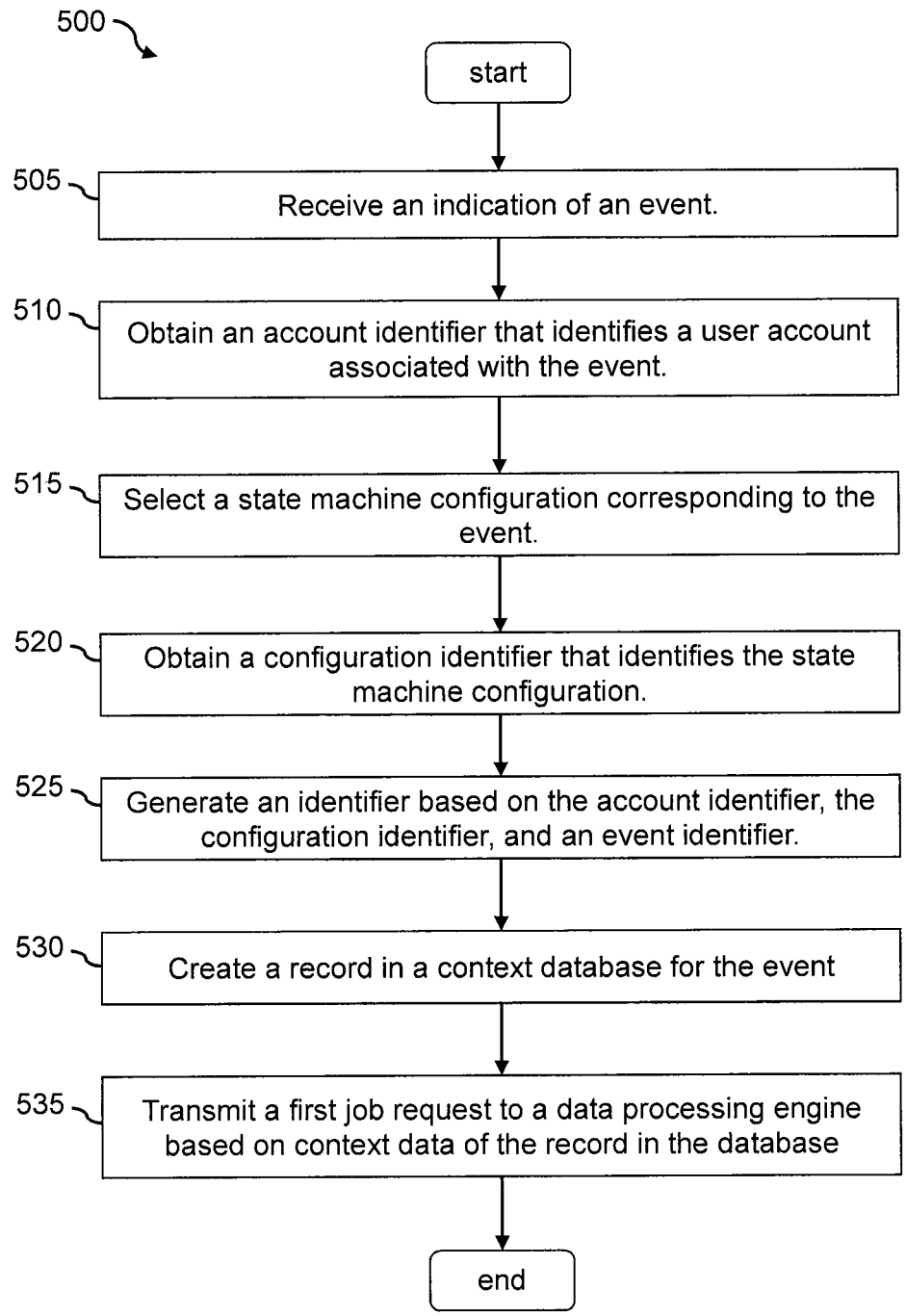
FIG. 5 is a flowchart showing a process of generating a session identifier according to an embodiment of the present disclosure.

FIG. 5 illustrates a process 500 for generating and utilizing identifiers for facilitating data processing for the applications according to various embodiments of the disclosure. In some embodiments, the process 500 may be performed by the stateless application framework 132 (and specifically the stateless application module 202) of the service provider server 130. The process 500 begins by receiving (at step 505) an indication of an event. The step 505 is substantially similar to the step 405 of FIG. 4. For example, the stateless application module 202 may receive the indication from one of the applications 222-226 (e.g., via an API call). In one example, the indication may be an onboarding event for a user account received from the onboarding application 222. Upon receiving the indication, a new instance of the stateless application module 202 may be instantiated to perform functionalities based on the indication.

In some embodiments, the indication of the event includes an event identifier identifying the event and an account identifier identifying a user account associated with the event. For example, if the event is a user onboarding event for a particular user account, the indication may include an event identifier that indicates the event is a user onboarding event, and an account identifier that identifies the event is associated with the particular user account. Thus, the process 500 at step 510 obtains an account identifier that identifies the user account associated with the event. Step 515 is substantially similar to the step 410 of FIG. 4, where a corresponding state machine configuration and a corresponding workflow is selected and retrieved (e.g., from the database 204).

In some embodiments, the stateless application module 202 selects the corresponding state machine configuration and the corresponding workflow based on the application from which the indication is received. For example, the stateless application module 202 may determine that the indication is received from the onboarding application 222, and may select and retrieve the state machine configuration 201a and the workflow corresponding to the onboarding application 222 from the context database 204.

After selecting the corresponding state machine configuration and workflow, the process 500 may obtain (at step 520) a state machine configuration identifier and a workflow identifier that identifies the selected state machine configuration and the selected workflow, respectively. The process 500 may then generate (at step 525) a session identifier based on at least one or more of the event identifier, the user account identifier, the state machine configuration identifier, and the workflow identifier. Different embodiments use different techniques to generate the identifier. For example, the stateless application module 202 may append the different identifiers together to form a single identifier (e.g., a single string). In some embodiments, the stateless application module 202 may perform a reversible mathematical computation on the different identifiers to generate the session identifier.

At step 530, the process 500 creates a record for the event and the user account. In some embodiments, in addition to the state data and the version number, the stateless application module 202 may also insert the session identifier in the record and may store the record in the context database 204. In some of these embodiments, the session identifier may serve as the primary key for the record, such that the session identifier may be used as the key to retrieve the record from among different records stored in the context database 204.

Step 535 is substantially similar to the step 420 of FIG. 4, where a first job request is transmitted to a data processing engine based on the context data of the record and the workflow. In some embodiments, in addition to the state data and the version number, the stateless application module 202 may also include the generated session identifier in the first job request (and any other job request sent to any one of the data processing engines 232-242).

In some embodiments, the process 500 may be performed in concert with the process 400 of FIG. 4. For example, the steps 510, 520, and 525 may be performed in the process 400 as well, and the steps 530 and 535 may replace the steps 415 and 425, respectively in the process 400 such that the session identifier is included in both the record and the first job request.

In such embodiments, the response received from the data processing engine at step 425 may also include the session identifier. As such, the stateless application module 202 may use the session identifier to retrieve the record corresponding to the event and the user account from the context database 204.

The statelessness of the stateless application framework 132 provides many benefits, including improving the efficiency of memory space and computer processing cycles, as the instances of the stateless application module 202 may be instantiated only when needed, and terminated after completing the tasks according to the workflow (e.g., delegating the corresponding tasks to one or more of the data processing engines 232-242, etc.). Since the instances of the stateless application module 202 are configured to perform tasks during the allocated processing cycles without idling (in order not to waste the processing resources), the stateless application module 202 may not perform tasks according to a pre-determined schedule, such as a delayed task. However, the workflows associated with the applications may require the stateless application module 202 to perform certain tasks on a pre-determined schedule. For example, the workflow associated with the onboarding application 222 may indicate to the stateless application module 202 to report a status (e.g., the state) of the user account and/or the event with respect to the onboarding process periodically (e.g., every hour, every day, etc.). In an another example, the workflow associated with the onboarding application 222 may indicate to the stateless application module 202 to transmit a reminder request to the data processing engine 232 a predetermined time period (e.g., 5 minutes, an hour, etc.) after the first job request is transmitted to the data processing engine 232.

Figure 6:
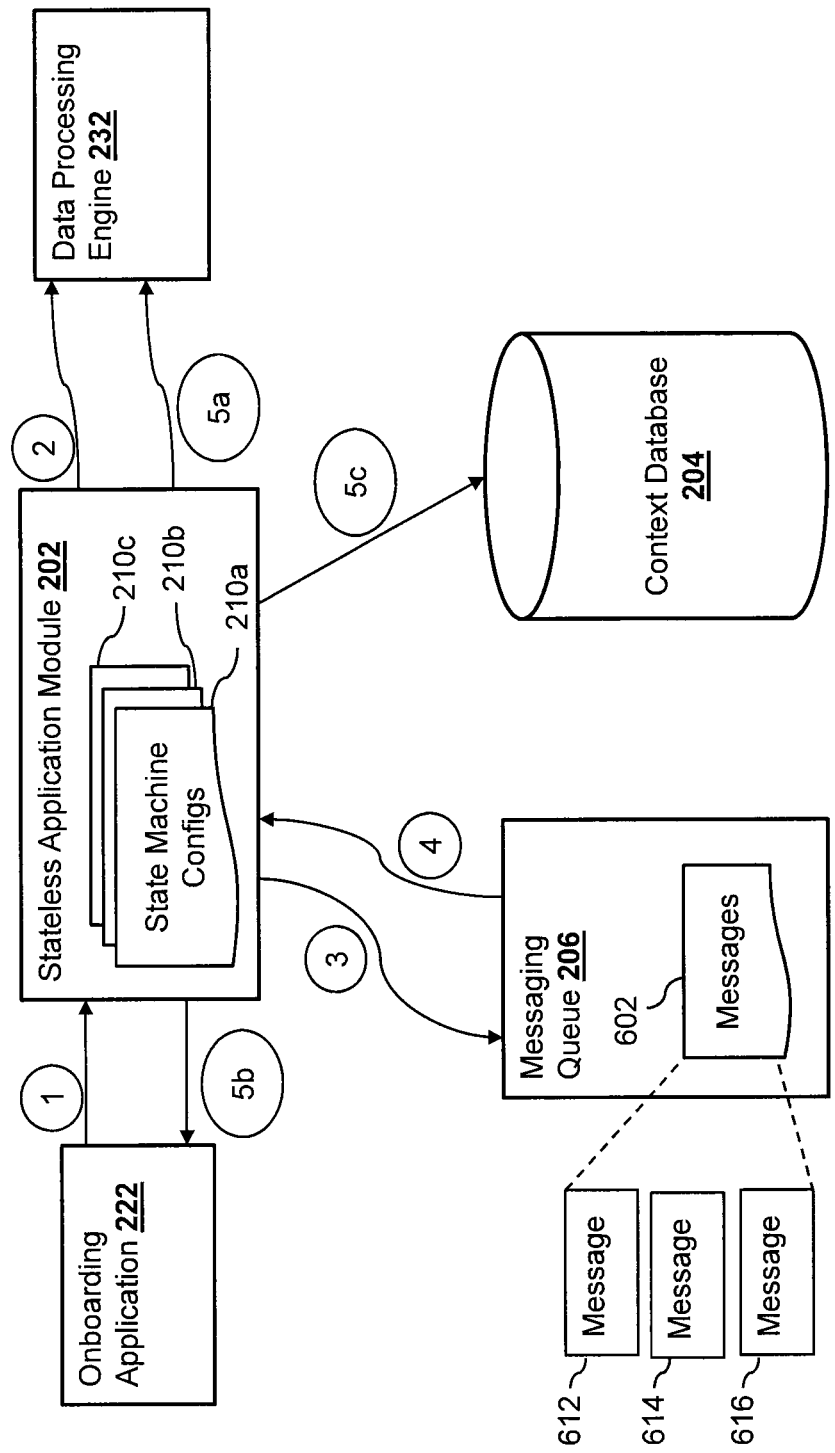
FIG. 6 illustrates an external scheduler for a stateless application implemented as a messaging queue according to an embodiment of the present disclosure.
Figure 7:
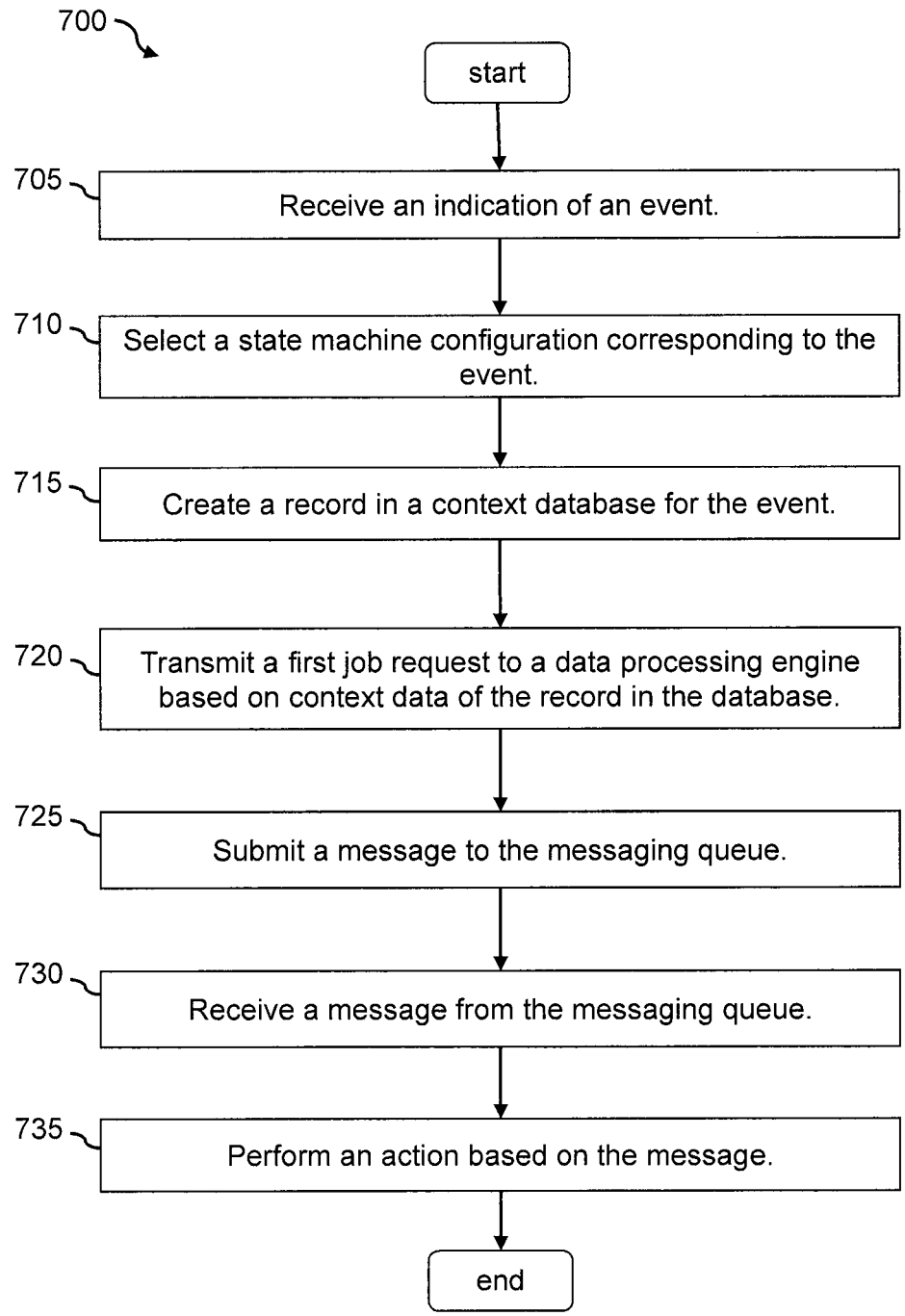
FIG. 7 is a flowchart showing a process of using a messaging queue to perform scheduled tasks according to an embodiment of the present disclosure.

As such, there is a need for a scheduler mechanism external to the stateless application module 202 to enable the stateless application module 202 to perform tasks on a pre-determined schedule different from the allocated processing cycles. Different embodiments may use different techniques to implement the external scheduler. In some embodiments, the external scheduler may be implemented as a messaging queue (e.g., the messaging queue (also referred to as the messaging module) 206). FIG. 6 illustrates an example of using an external scheduler to enable a stateless application module to perform scheduled tasks, and FIG. 7 illustrates a process 700 for using an external scheduler to enable a stateless application module to perform scheduled tasks according to various embodiments of the disclosure. In some embodiments, the process 700 may be performed by the stateless application framework 132 (and specifically the stateless application module 202 and the messaging queue 206) of the service provider server 130.

Steps 705 to 720 are substantially similar to the steps 405-420 of the process 400. The process 700 receives (at step 705) an indication of an event. For example, referring to FIG. 6, the stateless application framework 132 may receive an indication of an onboarding event associated with a user account from the onboarding application 222. In response to the indication, a new instance of the stateless application module 202 may be instantiated. The process 700 then selects (at step 710) a state machine configuration and a workflow corresponding to the event. For example, the stateless application module 202 may select and retrieve the corresponding state machine configuration and workflow based on the event. In some embodiments, the stateless application module 202 may also generate a session identifier for the event and the user account using the techniques described above by reference to FIG. 5.

At step 715, the process 700 creates a record for the event and the user account, and stores the record in a context database. For example, the stateless application module 202 may create a new record for the event and the user account. The stateless application module 202 may also assign an initial state to the user account for the event based on the workflow, and may store state data indicating the initial state in the record. As discussed above, the stateless application module 202 may also include an initial version number (e.g., version 1.0) and the generated session identifier in the record as well.

At step 720, the process transmits a first job request to a data processing engine based on the state data and the workflow. For example, the stateless application module 202 may transmit a first job request to the data processing engine 232. The first job request may include the session identifier, the state data, and the version number from the record. As discussed above, in addition to transmitting the first job request to the data processing engine 232, the workflow associated with the onboarding application may also indicate to the stateless application module 202 to perform additional actions on a delayed schedule. For example, the workflow may instruct the stateless application module 202 to send a reminder request to the data processing engine 232 a pre-determined time period (e.g., 5 minutes, 1 hour, etc.) after transmitting the first job request. In another example, the workflow may instruct the stateless application module 202 to transmit the current state (e.g., the state data in the record) of the user account to the onboarding application 222 periodically (e.g., every 5 minutes, every hour, etc.).

However, the instance of the stateless application module 202 is configured to terminate as soon as all the requested tasks are delegated to the one or more data processing engines 232-242 (and not idling). Thus, in some embodiments based on the workflow, the process 700 submits (at step 725) a message associated with the scheduled task to the messaging queue. For example, the instance of the stateless application module 202 may generate and transmit one or more messages to the messaging queue 206. The stateless application module 202 may generate a first message that indicates a recurring action of transmitting a status report to the onboarding application 222 at the predetermined frequency. The stateless application module 202 may also generate a second message that indicates transmitting a reminder request to the data processing engine 232 at a particular time (e.g., at time corresponding to the predetermined time period after the transmission of the first job request). Each of the messages is addressed back to the stateless application module 202 (e.g., including an IP address and a process identifier of the stateless application module 202 in the message, etc.). Furthermore, the stateless application module 222 may include the session identifier associated with the event and the user account in the messages. The instance of the stateless application module 202 may transmit the messages to the messaging queue 206, and then terminates.

The messaging queue 206 may be implemented in any one of the various techniques that can provide the functionalities described herein. In some embodiments, the messaging queue 206 may store messages in a data structure such as a queue structure or a list structure. The messaging queue 206 may also sort the messages in the queue according to the time indicated in the messages. For example, the messages may be sorted in an ascending order where the message indicating the earliest time is placed on the top of the queue and the message indicating the latest time is placed on the bottom of the queue. As shown in FIG. 6, the messaging queue 206 includes a queue 602. The queue 602 includes messages 612-616 that are sorted according to the time indicated in the messages 612-616.

When a new message is submitted to the messaging queue 206, the new message is inserted at a position within the queue 602 based on the time indicated in the new message. For example, if the new message indicates a time that is between a time indicated in the message 612 and the time indicated in the message 614, the messaging queue 206 may insert the new message after the message 612 and before the message 614.

In some embodiments, the messaging queue may include an internal clock, and may periodically (e.g., every minute, every five processing cycles, etc.) determine whether the time indicated in the message (e.g., the message 612) at the top of the queue 602 has passed based on the internal clock. If it is determined that the time indicated in the message 612 has not passed, the messaging queue 206 may idle and make such a determination at a later time. If it is determined that the time indicated in the message 612 corresponds to the current time or has passed based on the internal clock, the messaging queue 206 may pop the message 612 from the queue 602, and may transmit the message 612 to the address indicated in the message 612 (e.g., the stateless application module 202). The messaging queue 206 may then inspect the message 612 to determine whether it indicates a one-time action or a recurring action. If it is determined that the message 612 indicates a one-time action, the messaging queue 206 may discard the message 612, such that the message 614 becomes the top message in the queue 602. If it is determined that the message 612 indicates a recurring action, the messaging queue 206 may re-insert the message 612 back into the queue 602 based on the recurring frequency. For example, the messaging queue 206 may determine a time that the next recurring action should occur based on the frequency, and re-insert the message 612 based on the determined time. The messaging queue 206 may continue to perform the same sequence of actions to the top message of the queue 602 until the queue 602 is emptied.

Referring back to FIG. 7, the process 700 receives (at step 730) a message from the messaging queue and performs (at step 735) an action based on the message. For example, the stateless application framework 132 may receive the message 612 from the messaging queue 206. Upon receiving the message 612, the stateless application framework 132 may instantiate a new instance of the stateless application module 202 to handle the message 612. Since that other instance of the stateless application module 202 that submitted the message 612 has been terminated, this instance of the stateless application module 202 has no knowledge of the message 612 and would rely on the information indicated in the message 612 to act. In some embodiments, the instance of the stateless application module 202 may use the session identifier included in the message 612 to retrieve the corresponding record and the corresponding workflow from the context database 204. The stateless application module 202 may also determine a current state of the user account based on the state data in the record, and may perform an action based on the message, the state data in the record, and the workflow.

For example, when the message 612 indicates transmitting a reminder request to the data processing engine 232, the instance of the stateless application module 202 may generate and transmit a reminder request (including the state data and the version number from the retrieved record, and the session identifier) to the data processing engine 232. In another example, when the message 612 indicates reporting a current state of the user account to the onboarding application 222, the instance of the stateless application module 202 may transmit the state data from the retrieved record to the onboarding application 222. Upon completing the tasks indicated in the message 612, the instance of the stateless application module 202 may terminate.

Figure 8:
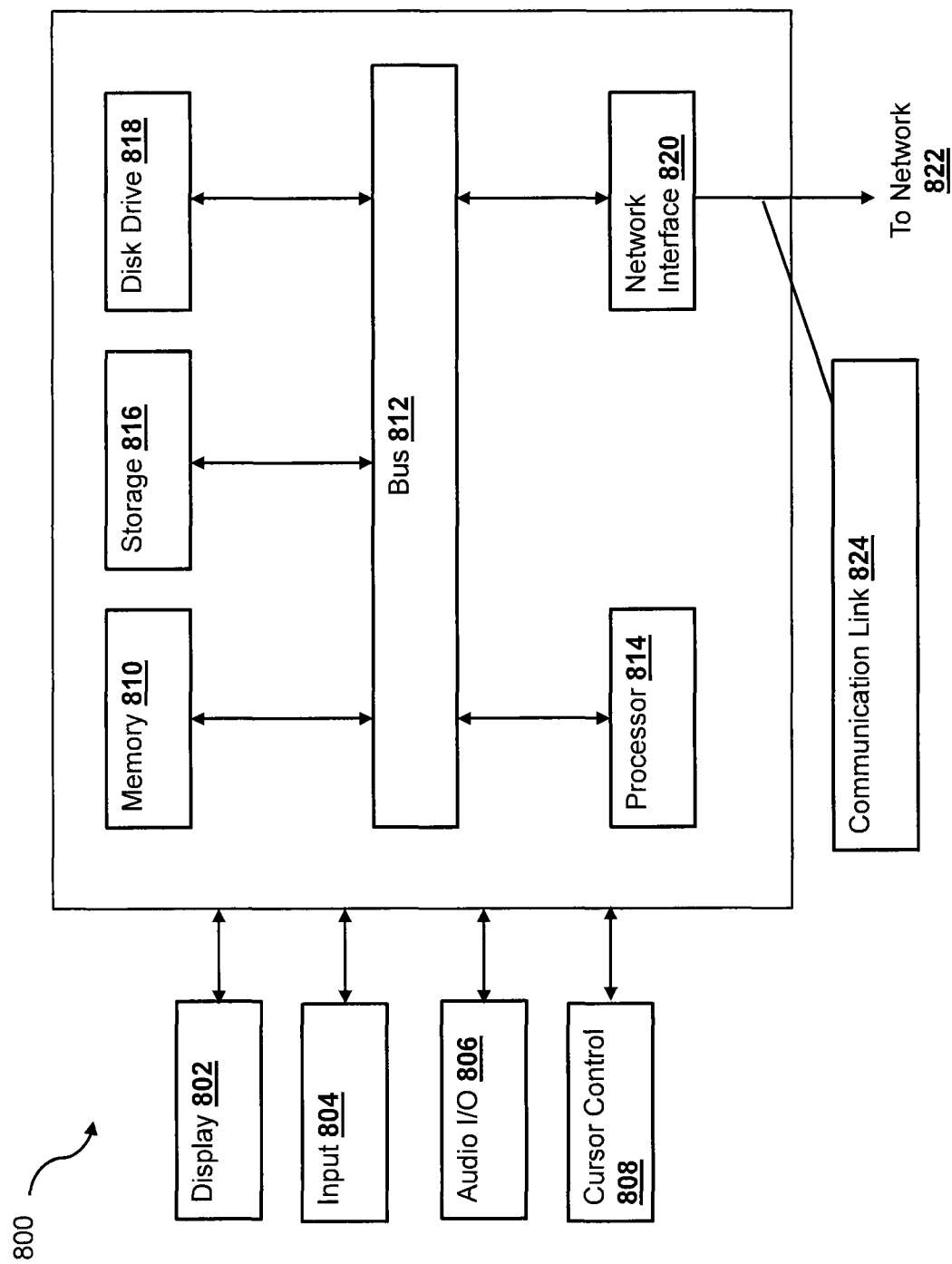
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the risk analysis functionalities described herein according to the processes 400, 500, and 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another. Thus, for example, a group of computing nodes and/or a server pool may perform various operations described herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
    obtaining, by a first instance of a stateless application executed on a computer system, a workflow associated with a user account, wherein the workflow indicates a first task and a second task, wherein the second task is associated with a delayed schedule;
    transmitting, by the first instance of the stateless application, a job request to a data processing engine based on the first task indicated in the workflow;
    submitting, by the first instance of the stateless application to a messaging module, a message addressed to the stateless application based on the workflow, wherein the message comprises a reference to the user account and the second task;
    in response to receiving the message from the messaging module, instantiating, by the computer system, a second instance of the stateless application; and
    performing, by the second instance of the stateless application, the second task based on the message.

2. The method of claim 1, wherein the second task comprises a job status inquiry associated with the job request, and wherein the performing the second task comprises transmitting a job status inquiry request to the data processing engine.

3. The method of claim 1, wherein the data processing engine is a first data processing engine, wherein the method further comprises receiving, from a second data processing engine, an indication of an event associated with the user account, and wherein the transmitting of the job request is responsive to receiving the indication.

4. The method of claim 3, further comprising in response to receiving the indication, accessing, by the first instance of the stateless application, a context database to create a record for the event, wherein the record comprises state data indicating a context of the user account within a state machine configuration.

5. The method of claim 4, wherein the second task comprises a state inquiry associated with the user account, wherein the performing the second task comprises:
    accessing, by the second instance of the stateless application, the context database to retrieve the state data from the record; and
    transmitting the state data to the second data processing engine.

6. The method of claim 4, further comprising:
    in response to receiving a response from the first data processing engine, instantiating, by the computer system, a third instance of the stateless application; and
    accessing, by the third instance of the stateless application, the context database to update the context of the user account by inserting second context data to the record based on the response.

7. The method of claim 4, wherein the message comprises a session identifier that identifies the user account, the event, and the state machine configuration.

8. The method of claim 7, wherein the indication comprises an account identifier associated with the user account and an event identifier associated with the event, and wherein the method further comprises:
    selecting, from a plurality of state machine configurations, the state machine configuration corresponding to the event; and
    generating the session identifier based on the user identifier, the event identifier, and a configuration identifier associated with the state machine configuration.

9. The method of claim 1, wherein the delayed schedule comprises a frequency.

10. The method of claim 1, wherein the messaging module is external to the stateless application.

11. The method of claim 1, further comprising terminating the first instance of the stateless application after submitting the message to the messaging module.

12. A system, comprising:
    a non-transitory memory; and
    one or more hardware processors coupled with the non-transitory memory and configured to read instructions from the non-transitory memory to cause the system to perform operations comprising:
        obtaining, by a first instance of a stateless application executed in the system, a workflow associated with a user account, wherein the workflow indicates a first task and a second task, wherein the second task is associated with a delayed time;
        transmitting, by the first instance of the stateless application, a job request to a data processing engine based on the first task indicated in the workflow;
        submitting, by the first instance of the stateless application to a messaging module, a first message addressed to the stateless application based on the workflow, wherein the first message comprises a reference to the user account and the second task;
        in response to receiving the first message from the messaging module, instantiating a second instance of the stateless application; and performing, by the second instance of the stateless application, the second task based on the first message.

13. The system of claim 12, wherein the messaging module comprises a queue having a plurality of messages.

14. The system of claim 13, wherein the operations further comprise inserting, by the messaging module, the first message in the queue based on the delayed time associated with the second task.

15. The system of claim 12, wherein the operations further comprise transmitting, by the messaging module, the first message to the stateless application according to the delayed time.

16. The system of claim 12, wherein the second task comprises a job status inquiry associated with the job request, and wherein the performing the second task comprises transmitting a job status inquiry request to the data processing engine.

17. The system of claim 12, wherein the second task comprises a status inquiry associated with the user account, and wherein the performing the second task comprises:
    retrieving, by the second instance of the stateless application, status data indicating a current status of the user account within the workflow; and
    transmitting, by the second instance of the stateless application, the status data to a second data processing engine.

18. The system of claim 12, wherein the operations further comprise terminating the first instance of the stateless application after submitting the first message to the messaging module.

19. A non-transitory machine readable medium having stored thereon machine-readable instructions executable to cause a machine to perform operations comprising:
    obtaining, by a stateless application executed on the machine, a workflow associated with a user account, wherein the workflow indicates a first task and a second task, wherein the second task is associated with a delayed time;
    transmitting, by the stateless application, a job request to a data processing engine based on the first task indicated in the workflow;
    submitting, by the stateless application to a messaging queue, a first message addressed to the stateless application based on the workflow, wherein the first message comprises a reference to the user account and the second task; and
    in response to receiving the first message from the messaging queue, performing, by the stateless application, the second task based on the first message.

20. The non-transitory machine readable medium of claim 19, wherein the messaging queue is external to the stateless application.

* * * * *